US009162143B2

(12) United States Patent
Olomskiy (10) Patent No.: US 9,162,143 B2
(45) Date of Patent: Oct. 20, 2015

(54) SYSTEM AND METHOD FOR PRESENTING A VIEW OF A VIRTUAL LOBBY ENVIRONMENT TO A USER

(75) Inventor: Evgeny Olomskiy, Vladivostok (RU)

(73) Assignee: ZOTOBI MANAGEMENT LTD., Tortola (VG)

( * ) Notice: Subject to any disclaimer, the term of this patent is extended or adjusted under 35 U.S.C. 154(b) by 78 days.

(21) Appl. No.: 13/231,614

(22) Filed: Sep. 13, 2011

(65) Prior Publication Data
US 2013/0065681 A1 Mar. 14, 2013

(51) Int. Cl.
*A63F 13/10* (2006.01)
*A63F 13/30* (2014.01)

(52) U.S. Cl.
CPC ........... *A63F 13/12* (2013.01); *A63F 2300/308* (2013.01); *A63F 2300/513* (2013.01); *A63F 2300/556* (2013.01); *A63F 2300/5566* (2013.01)

(58) Field of Classification Search
USPC ...................................... 463/31, 42
See application file for complete search history.

(56) References Cited

U.S. PATENT DOCUMENTS

| | | | | | |
|---|---|---|---|---|---|
| 6,117,011 | A * | 9/2000 | Lvov | ............... | 463/25 |
| 6,364,765 | B1 * | 4/2002 | Walker et al. | ................... | 463/16 |
| 7,727,060 | B2 | 6/2010 | Mills | ............... | 463/13 |
| 2003/0032479 | A1 * | 2/2003 | LeMay et al. | ................... | 463/32 |
| 2006/0025221 | A1 * | 2/2006 | Jain et al. | ....................... | 463/42 |
| 2006/0252530 | A1 * | 11/2006 | Oberberger et al. | ............ | 463/29 |
| 2006/0287097 | A1 * | 12/2006 | Moshal | ........................... | 463/42 |
| 2007/0093297 | A1 * | 4/2007 | Moshal | ........................... | 463/42 |
| 2007/0155500 | A1 | 7/2007 | Honour | ........................... | 463/37 |
| 2008/0176618 | A1 * | 7/2008 | Toompere | ...................... | 463/16 |
| 2009/0221367 | A1 * | 9/2009 | Longley et al. | ................. | 463/32 |
| 2010/0022308 | A1 | 1/2010 | Hartmann et al. | ............. | 463/42 |
| 2010/0029370 | A1 * | 2/2010 | Robinson et al. | .............. | 463/25 |
| 2010/0248843 | A1 | 9/2010 | Karsten | ........................... | 463/43 |
| 2011/0105224 | A1 * | 5/2011 | Hartmann et al. | ............. | 463/30 |
| 2011/0130184 | A1 | 6/2011 | Mills | ............................ | 463/13 |
| 2012/0015741 | A1 * | 1/2012 | Craine et al. | ................... | 463/42 |
| 2013/0231192 | A1 * | 9/2013 | Walker et al. | ................... | 463/42 |

OTHER PUBLICATIONS

Pogo.com home page—screenshot access date Aug. 3, 2011.
http://game3pogo.com/room/table/frameset.jsp?site=pogo&scrn=cmoreover&rkey=allin-plallinsf018&anam-bet—screenshot access date Aug. 3, 2011.
Zyngapoker home page screenshot access date Aug. 3, 2011.

* cited by examiner

*Primary Examiner* — Tramar Harper
(74) *Attorney, Agent, or Firm* — Pillsbury Winthrop Shaw Pittman LLP (57) ABSTRACT

A system is configured to present representations of game environments to users within views of lobby environments that facilitate intuitive and engaging browsing of the game environments by the users. The representations of the game environments may include environment information related to game session being held in the game environments. The representations may present the environment information in an intuitive and/or engaging manner. The game environments and/or the representations thereof may be organized into environments sets. Within the views of the lobby environments, the users may browse the game environments according to environment set.

16 Claims, 3 Drawing Sheets

SYSTEM AND METHOD FOR PRESENTING A VIEW OF A VIRTUAL LOBBY ENVIRONMENT TO A USER

FIELD OF THE DISCLOSURE

This disclosure relates to presenting a view of a virtual lobby environment to a user that enables the user to select a virtual game environment to join to participate in a game session, the view being configured to present representations of the virtual game environments to the user in sets, and with information about the game sessions taking place in the virtual game environments in an intuitive and immersive manner.

BACKGROUND

Systems that host a plurality of virtual game environments in which individual game sessions are held are known. In such systems, users may be provided with an interface to select a virtual game environment to join via a "game lobby". Conventional game lobbies tend to present the potential choices to users in a manner that is not intuitive and/or that does not mimic the way in which a user would select a game session to join in the real world. For example, in conventional game lobbies information about the ongoing game session and/or the users included therein tend to be heavily text based, and/or organized in a manner that is not parallel with how game sessions tend to be organized in the real world. For users, conventional game lobbies may reduce the level of immersion and/or engagement in the experience of selecting a game session to join.

SUMMARY

One aspect of the disclosure relates to a system and method of presenting representations of game environments to users within views of lobby environments that facilitate intuitive and engaging browsing of the game environments by the users. The representations of the game environments may include environment information related to game session being held in the game environments. The representations may present the environment information in an intuitive and/or engaging manner. The game environments and/or the representations thereof may be organized into environments sets. Within the views of the lobby environments, the users may browse the game environments according to environment set. For example, the users may scroll through representations of game environments within a given environment set in the manner that a player would walk through a set of game session in the real world. The information presented in the representations of the game environments provided to the users may include information that would be ascertainable to the player walking through game sessions in the real world. For example, such information may include identities of the users participating in game sessions in the game environments, status and/or score of users in the game sessions, relative positioning of the users in the game sessions, game session status and/or progress, and/or other information.

Within the lobby environment, the users may be able to create a new game session in a game environment. This opportunity may be presented in the form of a representation of a game environment that is empty. By selecting the empty game environment, a user may effectively initiate a game session in the empty game environment. This may be analogous to a user sitting down at an empty gaming table in the real world to initiate a new gaming session.

In some implementations, the system may include a server and client computing platforms that operate in a server/client configuration. Views of the lobby environments may be presented to the users on the client computing platforms, and the users may be able to interact with the lobby environments and/or select a virtual game environment for entry therein through inputs to the client computing platforms. The server may be configured to execute one or more of a game representation module, a game set module, a game lobby module, an environment module, and/or other modules.

The game representation module may be configured to obtain environment information representing a plurality of game environments in which separate game sessions are being held. The environment information for a given game environment may include information related to the game session being held therein. For example, the environment information representing a given game environment may include one or more of user information related to users currently participating in a game session being held in the given game environment, game pace information, game progress information, and/or other information. The user information related to a given user may include one or more of user identification information, an avatar representation, user status information, and/or other information.

The game set module may be configured to organize the plurality of game environments into environment sets. The game environments may be organized into the environment sets based on game parameters being used in the game sessions being held in the game environments. For example, game environments having common value(s) for one or more game parameters may be grouped together into an environment set. By way of non-limiting example, if the game sessions being held in the game environments are poker, the one or more game parameters may include the blind amounts.

The game lobby module may be configured to determine lobby view information for transmissions to a client computing platform associated with a user. The view information may facilitates presentation of a view of a lobby environment to the user on the client computing platform. The game lobby module and/or the client computing platform may be configured such that a view of the lobby environment includes a user selectable set control, an environment representation, and/or other information.

The user selectable set control may be configured to receive input from a user that controls which environment set is to be represented in the view of the lobby environment. The set control may include one or more of a menu, a field for receiving manual entry of a set, a scroll bar, one or more selectable buttons or icons, and/or other selectable control features. The user may select a set by entering or selecting in the set control value(s) for one or more game parameters. Responsive to reception of such control input, the game environments represented in the view of the lobby may be from the environment set having the selected and/or entered value(s) for the one or more game parameters.

The environment representation may represent a game environment from the current environment set. The environment representation may convey environment information obtained by the game representation module related to the game environment being represented by the environment representation. The game environment from the current environment set that is represented by the environment representation may be selectable by the user. For example, the view of the lobby environment may enable the user to scroll through the game environments in the current environment set. This may enable the user to view representations of the game session and/or game environments in a manner that mimics how a player would choose a game session to join in the real world. Scrolling through the representations may visually mimic the manner in which a player may walk past or through a plurality of gaming sessions in the real world to select the gaming session the player would like to participate in. The view of the lobby may enable the user to select the game environment currently being represented by the environment representation. Responsive to this selection, a view of the selected game environment may be presented to the user.

The gaming environments in a given environment set may include at least one gaming environment that is empty. An empty gaming environment may be a gaming environment in which no players are currently resident. A representation of an empty gaming environment may be provided to users within the view of the lobby to enable the user to effectively create a gaming session in the empty gaming environment by selecting the empty gaming environment and initiating a gaming session. Once a user has created a gaming session in this manner, the presence of the user in the previously empty gaming environment may be presented to other users in the representation of the previously empty gaming environment so that the other users can join the new gaming session.

The environment module may be configured to determine view information for transmission to the client computing platform. The view information may define a view of the game environment selected by the user via the lobby environment. The view information may facilitate presentation of the view of the game environment to the user on the client computing platform. The virtual game environment may be common between the users and one or more other users. In the view of the virtual game environment, the individual users may be represented by avatars.

The environment module may be configured to manage a game session being held within the game environment. Managing the game session may include one or more of determining score, assessing success and/or failure (e.g., of individual actions, sets, of actions, matches, game events within an individual match, and/or other episodes), determining random or pseudo-random game parameters (e.g., card value during ordering and/or distribution, dice values, battle multipliers, and/or other parameters), and/or other game management functions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
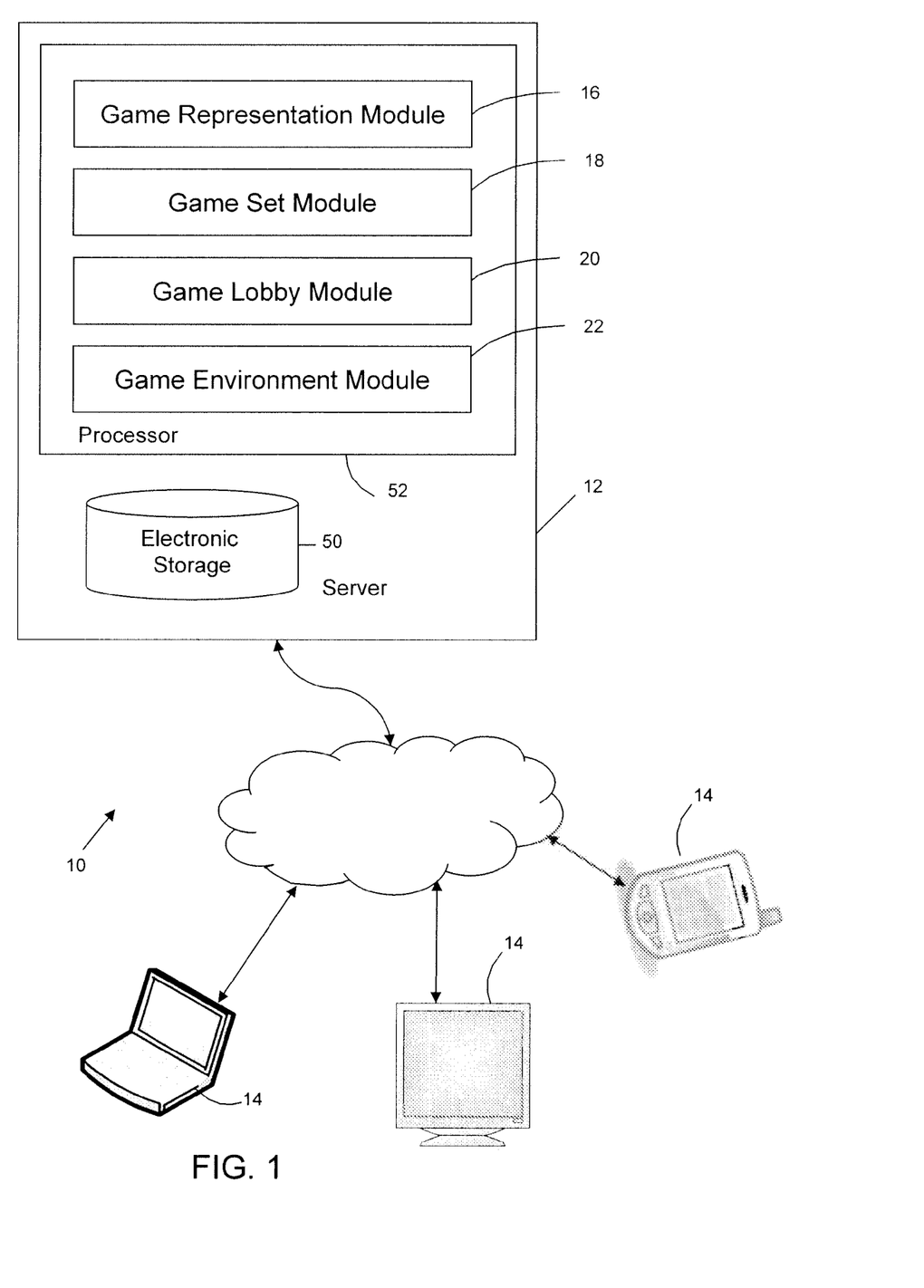
FIG. 1 illustrates a system configured to provide a virtual lobby environment to users.

FIG. 1 illustrates a system 10 configured to provide a virtual lobby environment to users. The virtual lobby environment may provide access for users to a plurality of different virtual game environments in which separate game sessions are being conducted. The system 10 may be configured such that the virtual lobby environment may present the virtual game environments to the users with an enhanced intuitiveness, enhanced aesthetics, additional and/or more easily discernible information about the individual virtual game environments, and/or other enhancements. Providing the virtual lobby environment may include hosting the virtual lobby environment over a network.

In some implementations, system 10 may include a server 12. The server 12 may be configured to communicate with one or more client computing platforms 14 according to a client/server architecture. The users may access system 10 and/or the virtual lobby environment via client computing platforms 14.

The server 12 may be configured to execute one or more computer program modules. The computer program modules may include one or more of a game representation module 16, a game set module 18, a game lobby module 20, an environment module 22, and/or other modules.

The game representation module 16 may be configured to obtain environment information related to a plurality of virtual game environments. As is discussed further herein, individual game sessions may be held within the separate game environments. The game sessions may be sessions of a common game. For example, the game may include a card game, a board game, a role playing game, shooter game, a sports video game, a strategy game (e.g., real-time or turn based), and/or other games. The environment information obtained for a given virtual game environment may include information related to the game session being held within the given virtual game environment.

By way of non-limiting example, the environment information obtained by game representation module 16 may include user information related to the users participating in the game session, session progress information related to the progress of the game session (e.g., at a beginning stage, close to an ending stage, and/or other progress information), pace information, and/or other information. The user information may include, for example, user identifications (e.g., usernames, avatar representations, real world identities, and/or other identifications), spatial arrangements of avatars, status information (e.g., points, total points, game session points, turn status, and/or other status information), and/or other user information. The pace information may include information related to a pace at which the game session has been played at in the past. The pace information may include time information (e.g., time lengths of completed game sessions or portions of game sessions), qualitative information about pace (e.g., fast, slow, normal, and/or other information), a rate of play, and/or other indications of playing pace.

The game set module 18 may be configured to organize the virtual game environments into sets of virtual game environments. This organization may be performed based on game parameters being used in the game sessions being held in the virtual game environments. Such game parameters may be related to scoring, time limits, minimum or maximum wagers, and/or other game parameters. For example, if the game being played in the game sessions is chess, the game parameter may include a time limit (e.g., per turn, over the course of the game, and/or other time limits). As another non-limiting example, if the game being played in the game session is poker, the game parameter may include one or more blinds. Other examples will be apparent. The game set module 18 may be configured to organize the virtual game environments into sets such that the game sessions in the virtual game environments within a given set may have a common value for one or more game parameters.

The game lobby module 20 may be configured to determine game lobby view information that defines views of lobby environments. The lobby view information determined by game lobby module 20 may be transmitted to client computing platforms 14, and implemented on client computing platforms 14 to present the views of the users of system 10. A given lobby environment may present environment representations to a user that represent the individual virtual game environments and/or the game sessions being held therein. Through the view of the given lobby environment, the user may be able to navigate the virtual game environments to identify and/or locate a virtual game environment having a game session in which the user would like to participate. The view of the given lobby environment may be implemented by the user to select the virtual game environment, and/or to enter the virtual game environment to participate in the game session.

Figure 2:
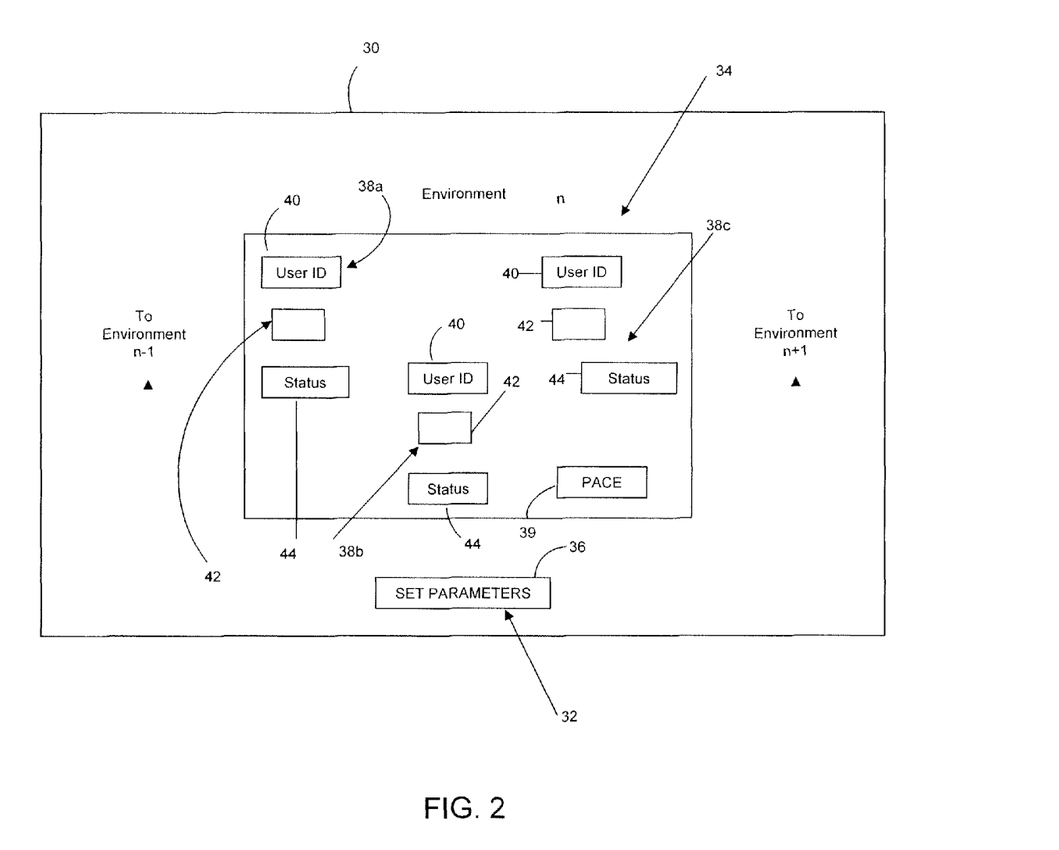
FIG. 2 illustrates a view of a virtual lobby environment.

By way of illustration, FIG. 2 illustrates a view 30 of a lobby environment. The view 30 may be defined by view information determined by a game lobby module similar to or the same as game lobby module 20 (shown in FIG. 1 and described herein). The view 30 may be presented to a user on a client computing platform similar to or the same as client computing platforms 14 (shown in FIG. 1 and described herein). As can be seen in FIG. 2, view 30 may include a set control 32, an environment representation 34, and/or other features.

The set control 32 may be configured to receive input from the user that controls which environment set is represented in view 30. The set control 32 may include a field 36 configured to receive entry and/or selection of value for one or more game parameter value(s). Selection and/or entry of the game parameter values via field 36 may result in the environment set having the selected game parameter value(s). In some implementations, field 36 may be configured to receive selection of value for a game parameter via a menu (e.g., a pop-up menu, a dropdown menu, and/or other menus), a scroll bar, a wheel, and/or other selection user interfaces. Responsive to selection of the value(s) for the one or more game parameters, environment representation 34 may represent virtual game environments within the environment set having the selected value(s) for the one or more game parameters.

The environment representation 34 may be configured to represent a virtual game environment within the current environment set. The environment representation 34 may convey environment information related to the current virtual game environment. The environment information may be presented in view 30 within one or more user representations 38 (illustrated in FIG. 2 as user representations 38*a*-38*c*), a pace field 39, and/or other fields.

The user representations 38 may be configured to convey user information for users participating in the game session in the current virtual game environment. The user information may be conveyed through one or more of an identification field 40, an avatar representation 42, a status field 44, and/or other fields. Information may be conveyed within one or more of fields 40, 42, and/or 44 via text, one or more images, video, graphic indicator, and/or via other mechanisms. The identification field 40 may be configured to present a user identification of the user being represented by a given user representation 38. The avatar representation 42 may be configured to present a representation of an avatar associated with the user being represented by the given user representation 38. The status field 44 may be configured to convey status information for the user being represented by the given user representation 38. In some implementations, the positions of the user representations 38 in environment representation 34 may represent the positions (e.g., relative positions, absolute positions, and/or other information) of the avatars associated with the users in the current virtual game environment.

The pace field 39 may present pace information for the current virtual game environment. The pace information may indicate a pace at which the game session being held within the current virtual game environment has been proceeding, an amount of progress in the game session being held within the current virtual game environment, and/or other pace information. The pace information may be presented textually, with one or more images, through video, with an indictor, and/or with other visual features.

The environment representation 34 may visually represent the current virtual game environment. This may include presenting one or more visual elements that visually resemble visual elements present in views of the current virtual game environment. For example, to represent the positions of the avatars associated with the users in the current virtual game environment, the positions of user representations 38 in environment representation 34 may correspond visually to the positions of the user avatars in the current virtual game environment. As another non-limiting example, environment representation 34 may include a visual depiction of one or more objects present in views of the current virtual game environment. For example, environment representation 34 may include an image of a gaming table present in views of the current virtual game environment. This may result in view 30 presenting simulations of the virtual game environments, as the user scrolls (or otherwise iterates) through the various virtual game environments within the current environment set.

The view 30 may facilitate selection by the user of a virtual game environment. Selection by the user of the virtual game environment may result in the user being provided with a view of the virtual game environment. Such a view may enable the user to participate in the game session being held in the selected virtual game environment. Selection may be made by the user, for example, through selection of environment representation 34, through selection of a control (not shown) presented in view 30, and/or through other interface selection mechanisms.

It will be appreciated that the illustration in FIG. 2 of view 30 including a single environment representation 34 is not intended to be limiting. In some implementations, view 30 may include a plurality of environment representations. The individual environment representations may represent different virtual game environments within the current environment set.

Referring back to FIG. 1, the gaming environments in a given environment set may include at least one gaming environment that is empty. An empty gaming environment may be a gaming environment in which no players are currently resident. A representation of an empty gaming environment may be provided to users within the view of the lobby to enable the user to effectively create a gaming session in the empty gaming environment by selecting the empty gaming environment and initiating a gaming session. Once a user has created a gaming session in this manner, the presence of the user in the previously empty gaming environment may be presented to other users in the representation of the previously empty gaming environment so that the other users can join the new gaming session.

The environment module 22 may be configured to provide one or more virtual game environments to users via client computing platforms 14. As used herein, a "virtual environment" may include a virtual space, one or more interactive, electronic social media, and/or other virtual environments. A virtual game environment may refer to a virtual environment in which a game session is being held that involves a plurality of users. Providing a virtual environment to users may include executing one or more instances of a virtual environment, determining view information representing the virtual environment (e.g., from the instance(s)) for the users (e.g., individually and/or collectively), transmitting the view information to the client computing platforms 14 associated with the users to facilitate views of the virtual environment being presented to the users, and/or other activities.

A virtual space may comprise a simulated space that is accessible by users via clients (e.g., client computing platforms 14) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout.

The above description of virtual spaces is not intended to be limiting. The environment module 22 may be configured to express the virtual space in a more limited, or more rich, manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a card table and/or a non-player character that are static (or change relatively little) visually in views of virtual space. Icons representing game components (e.g., game pieces, playing cards, dice, and/or other game components) may change and/or move within the views of the virtual space to depict a game being played within the virtual space. Other expressions of individual places within the virtual space are contemplated.

Within the instance(s) of the virtual space (or other virtual environment) executed by environment module 22, users may control avatars to interact with the virtual space and/or each other. As used herein, the term "user character" may refer to an object (or group of objects) present in the virtual space that represents an individual user. The avatar may be controlled by the user with which it is associated. The avatars may move through and interact with the virtual space (e.g., non-user characters in the virtual space, other objects in the virtual space), or the avatars may be relatively static visually within views of virtual space. The avatar representing a given user may be created and/or customized by the given user. The user may have an "inventory" of virtual goods and/or currency that the user can use (e.g., by manipulation of an avatar or other user controlled element, and/or other items), display, gift, and/or otherwise interact with within the virtual space.

The users may participate in the virtual space by controlling one or more of the available user controlled elements in the virtual space (e.g., game elements, avatars, and/or other elements). Control may be exercised through control inputs and/or commands input by the users through client computing platforms 14.

Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. As was the case with virtual spaces, in some implementations, users may be represented within interactive, electronic social media by avatars. An avatar representing a given user may be presented in views of the interactive, electronic social media as being associated with content that may be provided by the given user, directed the given user, related to the given user, and/or associated with the given user in other ways. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The environment module 22 may be configured to manage the game sessions being held within the virtual game environment. Managing the game sessions may include one or more of determining score, assessing success and/or failure (e.g., of individual actions, sets, of actions, matches, game events within an individual match, and/or other episodes), determining random or pseudo-random game parameters (e.g., card value during ordering and/or distribution, dice values, battle multipliers, and/or other parameters), and/or other game management functions. Managing the game sessions may include accepting input in the form of user selections and/or actions (e.g., input at client computing platforms 14), output from one or more random (or pseudo-random) number generators, rules and/or settings governing one or more game mechanics of the game, and/or other inputs. Managing the game sessions may include determining outputs in the form scores (e.g., of individual actions, sets, of actions, matches, game events within an individual match, and/or other episodes), winners and/or losers, required actions to be performed by the users, and/or other outputs.

By way of non-limiting example, environment module 22 may be configured to manage game sessions of poker being played within the virtual game environments. Such management may require one or more of determining blind size and/or assignment, determining card value and/or distribution, managing the pot (e.g., receiving bets, distributing winnings, and/or other management), determining hand winners, maintaining user chip stacks, maintaining user bank rolls, and/or other management tasks. As another non-limiting example, environment module 22 may be configured to manage same sessions of backgammon. Such management may require one or more of managing checker position, determining dice value, determining doubling cube value, determining score, determining a winner, and/or other management tasks. Implementations in which environment module 22 manages other game sessions are contemplated. Such games may be based on real world board and/or card games, and/or games that have not previously been implemented as real world games.

In some implementations, 12 server and client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by game lobby module 20), and to present a view of the lobby environment (e.g., as described above) based on the received view information. This may facilitate selection by the user of the given client computing platform 14 of a virtual game environment for participation. By way of non-limiting example, the given client computing platform 14 may include one or more of a desktop computer, a laptop computer, a handheld computer, a tablet computing platform, a NetBook, a Smartphone, a gaming console, and/or other computing platforms. The client computing platforms 14 may be configured to accept inputs from the users (e.g., via a view of the lobby environment) via touchscreen, keypad, tilt control, trackball, mouse, joystick, and/or via other user interfaces.

The server 12 may include electronic storage 50, one or more processors 52, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 52, information received from server 12, information received from client computing platforms 14, and/or other information that enables server 12 to function as described herein.

Processor(s) 52 is configured to provide information processing capabilities in server 12. As such, processor 52 may include one or more of a digital processor, an analog processor, a digital circuit designed to process information, an analog circuit designed to process information, a state machine, and/or other mechanisms for electronically processing information. Although processor 52 is shown in FIG. 1 as a single entity, this is for illustrative purposes only. In some implementations, processor 52 may include a plurality of processing units. These processing units may be physically located within the same device, or processor 52 may represent processing functionality of a plurality of devices operating in coordination. The processor 52 may be configured to execute modules 16, 18, and/or 20. Processor 52 may be configured to execute modules 16, 18, and/or 20 by software; hardware; firmware; some combination of software, hardware, and/or firmware; and/or other mechanisms for configuring processing capabilities on processor 52.

It should be appreciated that although modules 16, 18, 20 and 22 are illustrated in FIG. 1 as being co-located within a single processing unit, in implementations in which processor 52 includes multiple processing units, one or more of modules 16, 18, 20, and/or 22 may be located remotely from the other modules. By way of non-limiting example, environment module 22 may be executed by an environment server separate from (physically and/or logically) server 12. As another non-limiting example, some or all of the functionality attributed to modules 16, 18, 20, and/or 22 may be provided "in the cloud" by a plurality of processors connected through a network. The description of the functionality provided by the different modules 16, 18, 20, and/or 22 herein is for illustrative purposes, and is not intended to be limiting, as any of modules 16, 18, 20, and/or 22 may provide more or less functionality than is described. For example, one or more of modules 16, 18, 20, and/or 22 may be eliminated, and some or all of its functionality may be provided by other ones of modules 16, 18, 20, and/or 22. As another example, processor 52 may be configured to execute one or more additional modules that may perform some or all of the functionality attributed below to one of modules 16, 18, 20, and/or 22.

Figure 3:
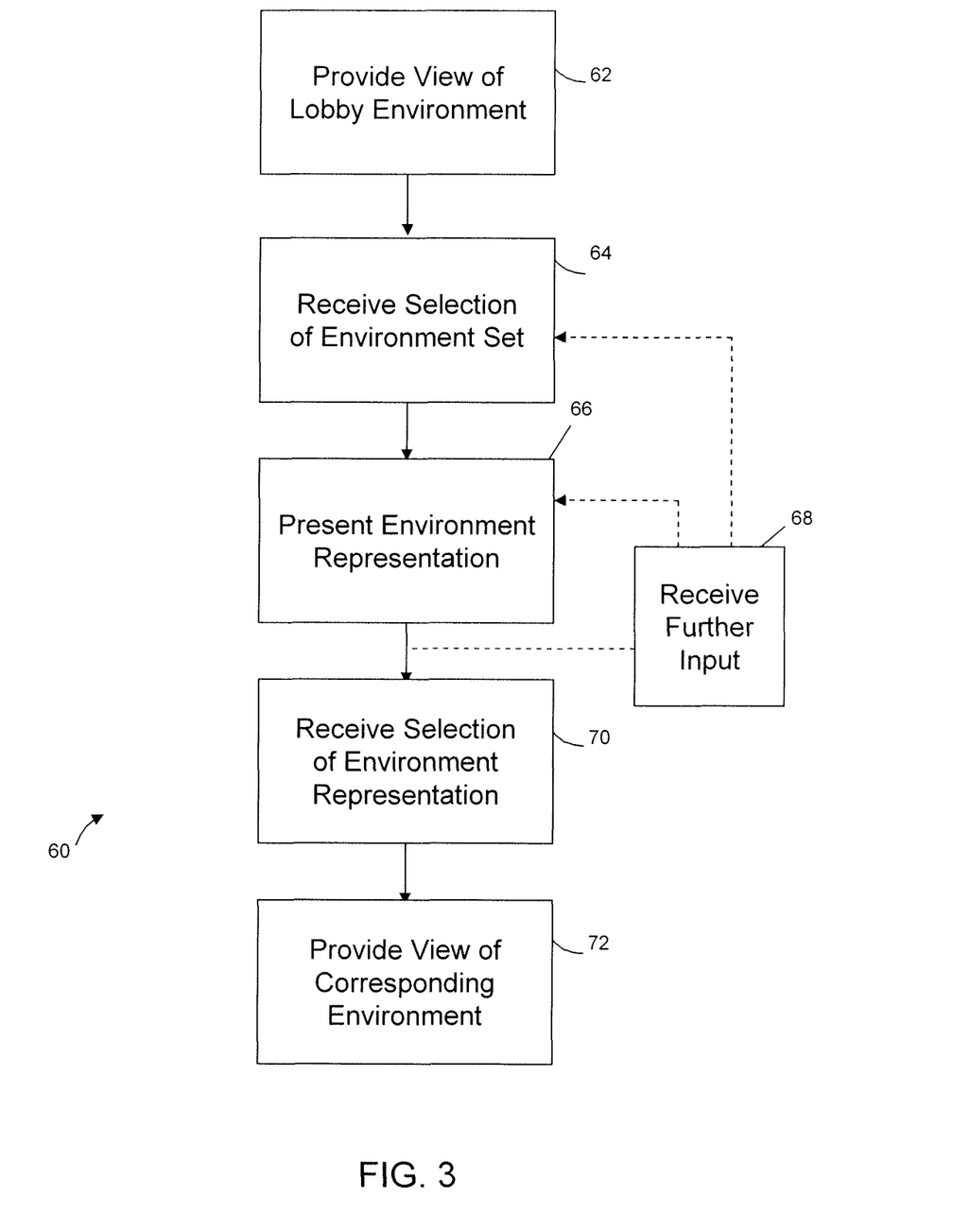
FIG. 3 illustrates a method of providing a virtual lobby environment to users.

FIG. 3 illustrates a method 60 of providing virtual lobby environments to users to facilitate selection by the users of virtual game environments in which to participate. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 3 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, a view of a lobby environment may be provided to a user. The view may be defined by view information generated by a server and transmitted to a client computing platform. The client computing platform may be configured to generate the view based on the received view information, and to present the view to the user via an electronic display. The view of the lobby environment may include a set control, an environment representation, and/or other features. The view of the lobby environment may be similar to or the same as view 30 (shown in FIG. 2 and described herein). The view information may be generated by a game lobby module similar to or the same as game lobby module 20 (shown in FIG. 1 and described herein). The view may be presented to the user by a client computing platform similar to or the same as client computing platform 14 (shown in FIG. 1 and described herein).

At an operation 64, a user selection of an environment set including virtual game environments in which game session are held having common value(s) for one or more game parameters may be received. The user selection may be received via the view provided to the user in operation 66. For example, the selection may be made via the set control.

At an operation 66, the environment representation in the view of the lobby environment may represent a virtual game environment from the environment selected by the user at operation 64.

At an operation 68, further control input may be received from the user. The further control input may include selection of another environment set, a request for representation of another virtual game environment (from the current environment set) in the view of the lobby, and/or other control inputs. Responsive to the control input including selection of another environment set, method 60 may return to operation 64. Responsive to the control input including a request for representation of another virtual game environment in the view of the lobby, method 60 may return to operation 66.

At an operation 70, a selection of the virtual game environment currently being represented by the environment representation in the view of the lobby environment may be received. In some implementations, this selection may be received via the client computing platform and/or the server.

At an operation 72, a view of the selected virtual game environment may be provided to the user. This may facilitate participation by the user in the game session being held in the selected virtual game environment. The view may be defined by view information generated by a server and transmitted to a client computing platform. The client computing platform may be configured to generate the view based on the received view information, and to present the view to the user via an electronic display. The view information may be generated by a environment module similar to or the same as environment module 22 (shown in FIG. 1 and described herein). The view may be presented to the user by the client computing platform.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to present representations of online game environments to users via one or more client computing platforms, the system comprising:
one or more physical processors configured to execute computer program instructions to:
obtain environment information representing a plurality of game environments in which separate game sessions are being held, the individual game environments including gaming tables at which the game sessions are held, wherein the environment information representing a first game environment comprises user information related to users currently occupying stations at an individual gaming table in the first game environment and participating in game session being held in the first game environment;
organize the plurality of game environments into environment sets based on game parameters being used in the game sessions being held in the game environments;
determine lobby view information for transmissions to a client computing platform associated with a user that facilitates presentation of a view of a lobby environment to the user on the client computing platform such that a view of the lobby environment includes:
a user selectable set control configured to receive input from a user that controls which environment set is to be represented in the view of the lobby environment; and
an environment representation of a game environment from the environment set currently being represented in the view of the lobby environment, wherein an environment representation of the first game environment depicts a visual representation of the individual gaming table that resembles a real world gaming table in the first game environment and conveys environment information obtained related to the first game environment, such conveyed environment information including (i) the individual gaming table, (ii) the stations at the individual gaming table of the users currently participating in the individual game session being held in the first game environment, (iii) the current gameplay status, including one or more of points, total points, or game session points, of the users currently occupying stations at the individual gaming table and (iv) the status of the individual game session being held in the first game environment, and
wherein the view of the lobby environment facilitates selection of individual game representations for inclusion in the view of the lobby environment through scrolling individually through the game representations that represent a user selected environment set wherein the scrolling through the individual game representations providing a corresponding visual representation of the individual gaming tables is facilitated through one or more user selectable controls adjacent the environment representation of the game environment.

2. The system of claim 1, wherein the game sessions being held in the different game environments have different values for a set of one or more game parameters, and wherein the game environments are organized into environment sets such that the game sessions being held in game environments within a common environment set have common values for the one or more game parameters.

3. The system of claim 2, wherein the game sessions are sessions of poker, and wherein the one or more game parameters are one or more blind amounts.

4. The system of claim 1, wherein the user selectable set control is represented in view of the lobby environment as a scroll bar that facilitates scrolling through the environment sets by the user.

5. The system of claim of claim 1, wherein scrolling individually through the game representations mimics walking through a series of game sessions.

6. The system of claim 1, wherein the status of the game session being held in the first game environment included in the environment representation of the first game environment comprises user status information for the users currently participating in the game session in the first game environment.

7. The system of claim 1, wherein the status of the game session being held in the first game environment included in the environment representation of the first game environment comprises pace information related to paces at which the game sessions being held in the first game environments have been proceeding.

8. The system of claim 1, wherein the one or more physical processors are further configured to execute computer program instructions to:
receive user selection of the individual game representation currently being presented; and
to initiate participation of the user in the individual game session being held in a game environment represented by the game representation responsive to reception of the user selection.

9. A client computing platform configured to present a view of a lobby environment to a user, the client computing platform comprising:
an electronic display;
a control interface;
one or more physical processors configured to execute computer program instructions to:
receive view information from a server, and generate a view of a lobby environment for presentation to a user via the electronic display, wherein the server is configured to host a plurality of game environments in which separate game sessions are being held, the individual game environments including gaming tables at which the game sessions are held, wherein the plurality of game environments are organized into environment sets, and wherein the view of the lobby environment includes:
a user selectable set control configured to receive input from a user that controls which environment set is to be represented in the view of the lobby environment; and
an environment representation of a game environment from the environment set currently being represented in the view of the lobby environment, wherein an environment representation of the first game environment depicts a visual representation of an individual gaming table that resembles a real world gaming table in the first game environment and conveys environment information related to the first game environment, such conveyed environment information including (i) the individual gaming table, (ii) the stations at the individual gaming table of users currently participating in the individual game session being held in the first game environment, (iii) the current game play status, including one or more of points, total points, or game session points, of the users currently occupying stations at the individual gaming table and (iv) status of the individual game session being held in the first game environment, and wherein the view of the lobby environment facilitates selection of individual game representations for inclusion in the view of the lobby environment through scrolling individually through the game representations that represent a user selected environment set wherein the scrolling through the individual game representations that provide a corresponding visual representation of the individual gaming table is facilitated through one or more user selectable controls adjacent the environment representation of the game environment.

10. The client computing platform of claim 9, wherein the game sessions being held in the different game environments have different values for a set of one or more game parameters, and wherein the game environments are organize into environment sets such that the game sessions being held in game environments within a common environment set have common values for the one or more game parameters.

11. The client computing platform of claim 10, wherein the game sessions are sessions of poker, and wherein the one or more game parameters are one or more blind amounts.

12. The client computing platform of claim 9, wherein the user selectable set control is represented in view of the lobby environment as a scroll bar that facilitates scrolling through the environment sets by the user.

13. The client computing platform of claim 9, wherein the control interface is configured such that scrolling individually through the game representations mimics walking through a series of game sessions.

14. The client computing platform of claim 9, wherein the status of the game session being held in the first game environment included in the environment representation of the first game environment comprises user status information for the users currently participating in the game session in the first game environment.

15. The client computing platform of claim 9, wherein the status of the game session being held in the first game environment included in the environment representation of the first game environment comprises pace information for game sessions being held in the first game environment.

16. The client computing platform of claim 9, wherein the control interface is configured to receive user selection of the individual game environment being represented by the environment representation, wherein such user selection results in participation of the user in the individual game session being held in the game environment.

* * * * *